US012579734B2

(12) United States Patent
Sun

(10) Patent No.: US 12,579,734 B2
(45) Date of Patent: Mar. 17, 2026

(54) METHOD FOR RENDERING VIEWPOINTS AND ELECTRONIC DEVICE

(71) Applicant: BOE Technology Group Co., Ltd., Beijing (CN)

(72) Inventor: Xuan Sun, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 157 days.

(21) Appl. No.: 18/641,421

(22) Filed: Apr. 21, 2024

(65) Prior Publication Data

US 2025/0061643 A1 Feb. 20, 2025

Related U.S. Application Data

(63) Continuation of application No. PCT/CN2023/112869, filed on Aug. 14, 2023.

(51) Int. Cl.
*G06T 15/20* (2011.01)
*G06T 5/50* (2006.01)
*G06T 5/60* (2024.01)

(52) U.S. Cl.
CPC ............... *G06T 15/20* (2013.01); *G06T 5/50* (2013.01); *G06T 5/60* (2024.01); *G06T 2207/20084* (2013.01); *G06T 2207/20221* (2013.01)

(58) Field of Classification Search
CPC .. G06T 15/20; G06T 5/50; G06T 5/60; G06T 2207/20084; G06T 2207/20221
(Continued)

(56) References Cited

U.S. PATENT DOCUMENTS

| | | | |
|---|---|---|---|
| 12,423,786 B2 * | 9/2025 | Zhang | G06N 3/045 |
| 2020/0160546 A1 * | 5/2020 | Gu | G06T 3/18 |

(Continued)

FOREIGN PATENT DOCUMENTS

| | | |
|---|---|---|
| CN | 102609974 A | 7/2012 |
| CN | 107945282 A | 4/2018 |

(Continued)

OTHER PUBLICATIONS

Viswanath et al.; "Dimensionality reduction-based fusion approaches for imaging and non-imaging biomedical data: concepts, workflow, and use-cases"; BMC Medical Imaging (Year: 2017).*

(Continued)

*Primary Examiner* — David T Welch
(74) *Attorney, Agent, or Firm* — IPro, PLLC

(57) ABSTRACT

A method for rendering viewpoints is provided. The method for rendering viewpoints of the present disclosure includes: acquiring a first initial feature of a two-dimensional image and a second initial feature of a depth image corresponding to the two-dimensional image by performing initial feature extraction on the two-dimensional image and the depth image; acquiring a first initial dimension reduction feature by splicing the first initial feature and the second initial feature in a channel dimension and performing channel dimension reduction; acquiring a fusion feature by performing image distortion and restoration on the first initial dimension reduction feature for multiple times; and generating a plurality of viewpoint images by performing fusion and channel dimension reduction on the fusion feature.

15 Claims, 8 Drawing Sheets

(58) Field of Classification Search
USPC .......................................................... 345/427
See application file for complete search history.

(56) References Cited

U.S. PATENT DOCUMENTS

| | | | | |
|---|---|---|---|---|
| 2021/0264632 | A1* | 8/2021 | Tankovich | .............. G06T 7/593 |
| 2022/0277472 | A1* | 9/2022 | Birchfield | ................. G06T 7/73 |
| 2023/0092248 | A1* | 3/2023 | Xiong | ................. G06V 10/759 |
| | | | | 382/103 |
| 2023/0154055 | A1* | 5/2023 | Besenbruch | .......... G06N 3/092 |
| | | | | 375/240.03 |
| 2023/0360241 | A1* | 11/2023 | Sayed | ...................... G06T 17/00 |
| 2024/0061075 | A1* | 2/2024 | Popov | .................... G06V 20/58 |
| 2024/0104345 | A1* | 3/2024 | Peng | ...................... G06N 3/063 |
| 2024/0217538 | A1* | 7/2024 | Guizilini | .............. B60W 40/02 |
| 2024/0419382 | A1* | 12/2024 | Dekel | .................... G06V 20/70 |
| 2025/0095302 | A1* | 3/2025 | Wetmore | ................ G06F 3/013 |
| 2025/0131647 | A1* | 4/2025 | Talegaonkar | ........... G06T 17/00 |
| 2025/0148633 | A1* | 5/2025 | Yasarla | .................... G06T 7/50 |

FOREIGN PATENT DOCUMENTS

| | | |
|---|---|---|
| CN | 109462747 A | 3/2019 |
| CN | 110246146 A | 9/2019 |
| CN | 110689599 A | 1/2020 |
| CN | 111325693 A | 6/2020 |
| CN | 111669564 A | 9/2020 |
| CN | 112738495 A | 4/2021 |
| CN | 113487664 A | 10/2021 |
| DE | 102018130230 A1 | 6/2020 |

OTHER PUBLICATIONS

PCT/CN2023/112869 international search report dated Dec. 23, 2023.

* cited by examiner

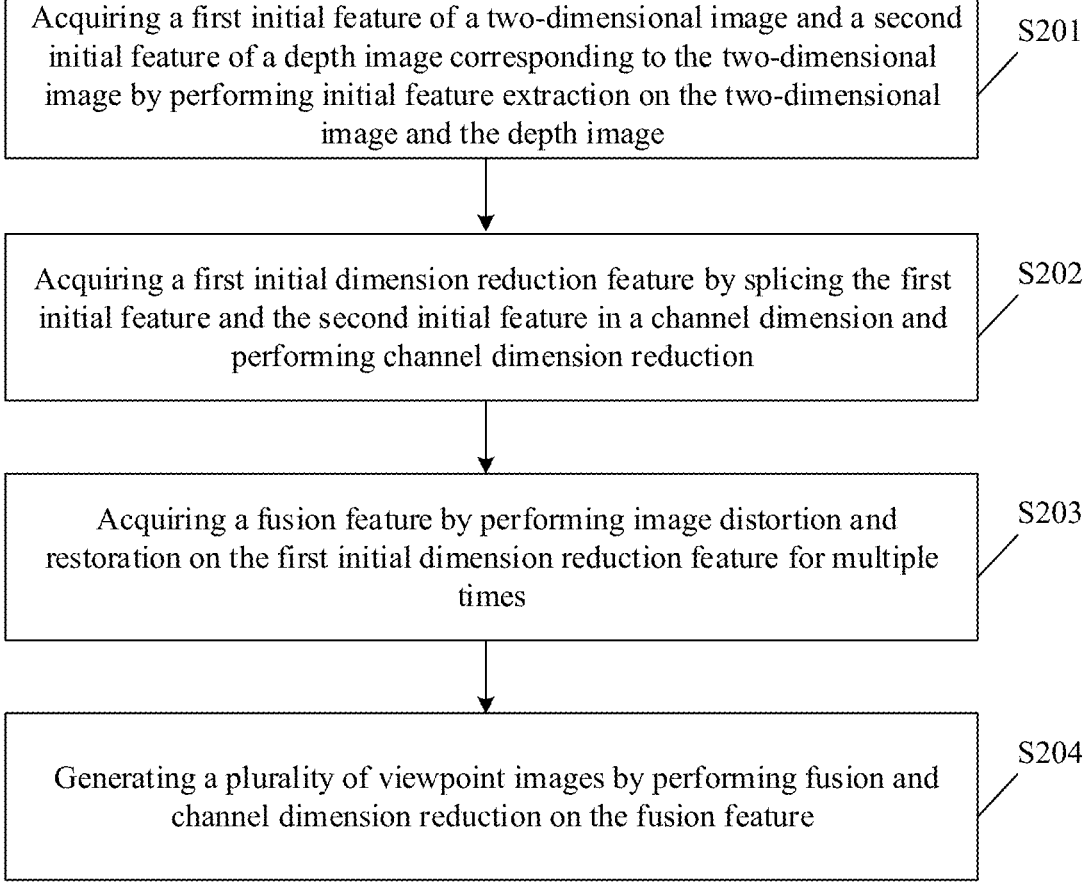

Acquiring a first initial feature of a two-dimensional image and a second initial feature of a depth image corresponding to the two-dimensional image by performing initial feature extraction on the two-dimensional image and the depth image — S201

Acquiring a first initial dimension reduction feature by splicing the first initial feature and the second initial feature in a channel dimension and performing channel dimension reduction — S202

Acquiring a fusion feature by performing image distortion and restoration on the first initial dimension reduction feature for multiple times — S203

Generating a plurality of viewpoint images by performing fusion and channel dimension reduction on the fusion feature — S204

FIG. 2

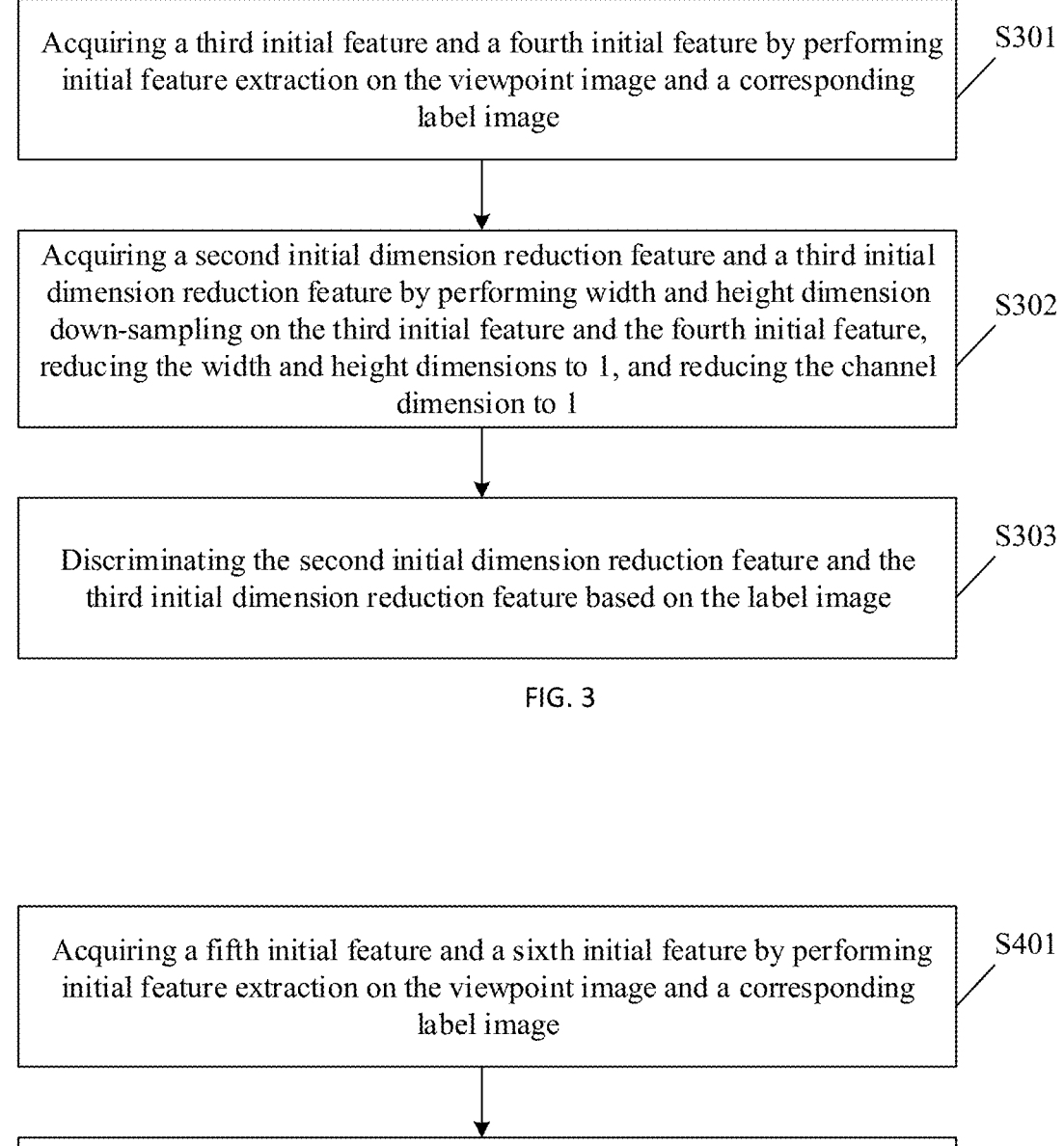

Acquiring a third initial feature and a fourth initial feature by performing initial feature extraction on the viewpoint image and a corresponding label image — S301

Acquiring a second initial dimension reduction feature and a third initial dimension reduction feature by performing width and height dimension down-sampling on the third initial feature and the fourth initial feature, reducing the width and height dimensions to 1, and reducing the channel dimension to 1 — S302

Discriminating the second initial dimension reduction feature and the third initial dimension reduction feature based on the label image — S303

FIG. 3

Acquiring a fifth initial feature and a sixth initial feature by performing initial feature extraction on the viewpoint image and a corresponding label image — S401

Acquiring a fourth initial dimension reduction feature and a fifth initial dimension reduction feature by performing width and height dimension down-sampling on the fifth initial feature and the sixth initial feature and reducing the channel dimension to 1ension reduction feature — S402

Discriminating the fourth initial dimension reduction feature and the fifth initial dimension reduction feature based on the label image — S403

FIG. 4

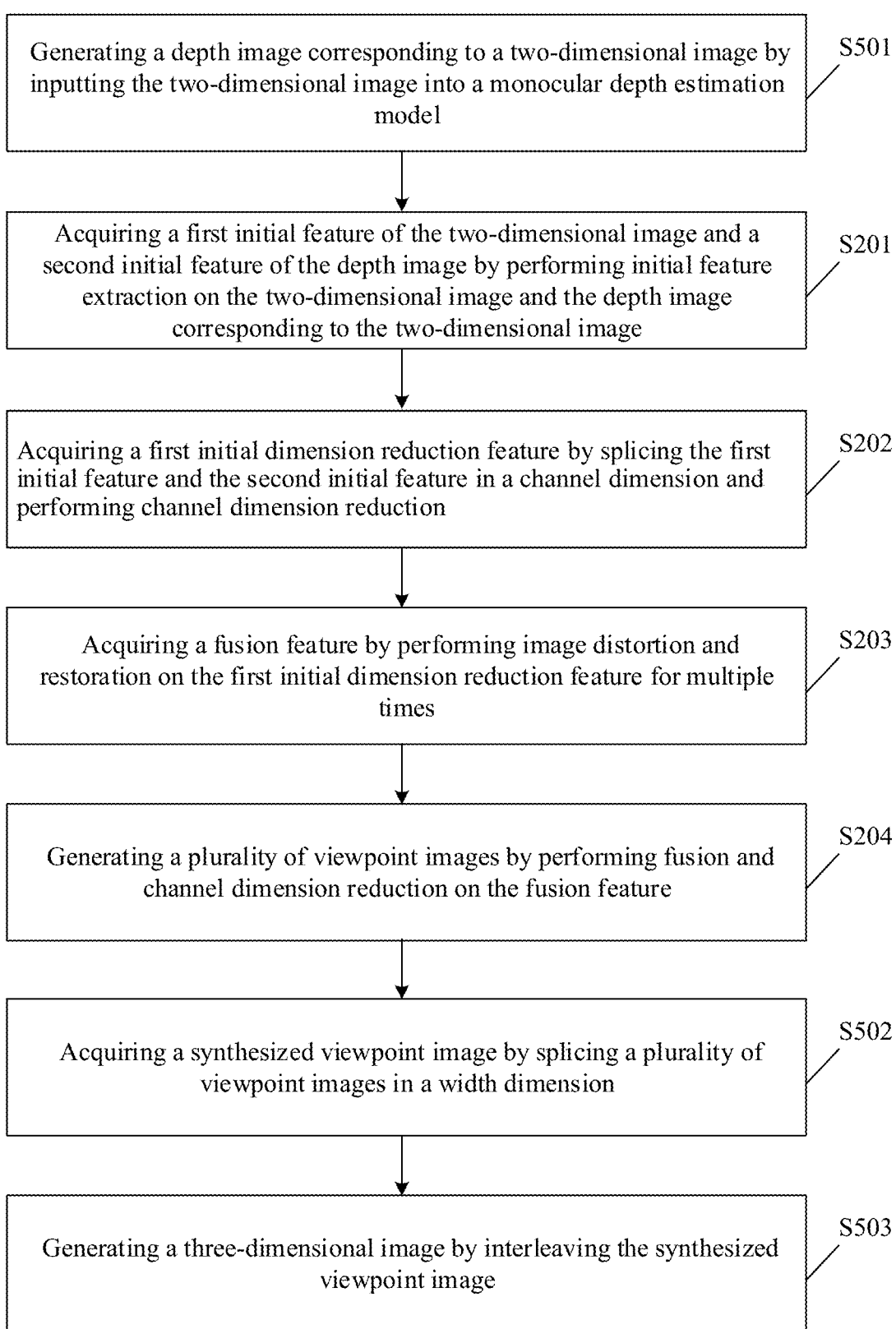

Generating a depth image corresponding to a two-dimensional image by inputting the two-dimensional image into a monocular depth estimation model       S501

Acquiring a first initial feature of the two-dimensional image and a second initial feature of the depth image by performing initial feature extraction on the two-dimensional image and the depth image corresponding to the two-dimensional image       S201

Acquiring a first initial dimension reduction feature by splicing the first initial feature and the second initial feature in a channel dimension and performing channel dimension reduction       S202

Acquiring a fusion feature by performing image distortion and restoration on the first initial dimension reduction feature for multiple times       S203

Generating a plurality of viewpoint images by performing fusion and channel dimension reduction on the fusion feature       S204

Acquiring a synthesized viewpoint image by splicing a plurality of viewpoint images in a width dimension       S502

Generating a three-dimensional image by interleaving the synthesized viewpoint image       S503

FIG. 5

METHOD FOR RENDERING VIEWPOINTS AND ELECTRONIC DEVICE

CROSS-REFERENCE TO RELATED APPLICATIONS

The present disclosure is a continuation application of International Application No. PCT/CN2023/112869, filed on Aug. 14, 2023, the disclosure of which is herein incorporated by reference in its entirety.

TECHNICAL FIELD

The present disclosure relates to the field of display technologies, and in particular, relates to a method for rendering viewpoints and an electronic device.

BACKGROUND

With the diversification and high standardization of users' requirements, ultra-high-definition two-dimensional (2D) images are gradually difficult to meet users' viewing requirements. Three-dimensional (3D) images featuring in three-dimensional sense and visual impact have become the latest pursuit among users. Therefore, naked-eye 3D display technology has become the latest hotspot in the display field today. With the launch of naked-eye 3D display products, a wide variety of demands for consumer-grade 3D content has risen in the market.

SUMMARY

Embodiments of the present disclosure provide a method and apparatus for rendering viewpoints.

In a first aspect, embodiments of the present disclosure provide a method for rendering viewpoints. The method for rendering viewpoints includes: acquiring a first initial feature of a two-dimensional image and a second initial feature of a depth image corresponding to the two-dimensional image by performing initial feature extraction on the two-dimensional image and the depth image; acquiring a first initial dimension reduction feature by splicing the first initial feature and the second initial feature in a channel dimension, and performing channel dimension reduction; acquiring a fusion feature by performing image distortion and restoration on the first initial dimension reduction feature for multiple times; and generating a plurality of viewpoint images by performing fusion and channel dimension reduction on the fusion feature.

In a second aspect, the embodiments of the present disclosure provide an electronic device. The electronic device includes: at least one processor; and a memory stores one or more computer programs executable by the at least one processor, wherein the at least one processor, when loading and executing the one or more computer programs, is caused to perform: acquiring a first initial feature of a two-dimensional image and a second initial feature of a depth image corresponding to the two-dimensional image by performing initial feature extraction on the two-dimensional image and the depth image; acquiring a first initial dimension reduction feature by splicing the first initial feature and the second initial feature in a channel dimension and performing channel dimension reduction; acquiring a fusion feature by performing image distortion and restoration on the first initial dimension reduction feature for multiple times; and generating a plurality of viewpoint images by performing fusion and channel dimension reduction on the fusion feature.

In a third aspect, the embodiments of the present disclosure provide a computer-readable storage medium storing at least one computer program therein, wherein the at least one computer program, when executed by a processor, causes the processor to perform: acquiring a first initial feature of a two-dimensional image and a second initial feature of a depth image corresponding to the two-dimensional image by performing initial feature extraction on the two-dimensional image and the depth image; acquiring a first initial dimension reduction feature by splicing the first initial feature and the second initial feature in a channel dimension and performing channel dimension reduction; acquiring a fusion feature by performing image distortion and restoration on the first initial dimension reduction feature for multiple times; and generating a plurality of viewpoint images by performing fusion and channel dimension reduction on the fusion feature.

BRIEF DESCRIPTION OF THE DRAWINGS

FIG. 2 is a schematic flowchart of a method for rendering viewpoints according to some embodiments of the present disclosure;

FIG. 3 is a schematic flowchart of another method for rendering viewpoints according to some embodiments of the present disclosure;

FIG. 4 is a schematic flowchart of still another method for rendering viewpoints according to some embodiments of the present disclosure;

FIG. 5 is a schematic flowchart of yet still another method for rendering viewpoints according to some embodiments of the present disclosure;

DETAILED DESCRIPTION

To enable those skilled in the art to better understand the technical solutions of the present disclosure, the present disclosure is further described in detail below with reference to the accompanying drawings and specific embodiments.

Unless otherwise defined, technical or scientific terms used in the present disclosure should have ordinary meanings as understood by those of ordinary skill in the art to which the present disclosure belongs. The terms "first", "second", and other similar words, as used in the present disclosure do not indicate any order, quantity, or importance, but are merely defined to distinguish different components. Likewise, the terms "a", "an", "the", or other similar words do not indicate a limitation of quantity, but rather the presence of at least one. The terms "include", "comprise", or other similar words indicate that the elements or objects stated before them encompass the elements or objects and equivalents thereof listed after them, but do not exclude other elements or objects. The terms "connecting", "connected", or other similar words are not limited to physical or mechanical connections, but may include electrical connections, whether direct or indirect. The terms "up", "down", "left", "right", and the like are merely defined to indicate relative positional relationships. In the case that the absolute position of a described object changes, the relative position relationship may also change accordingly.

Currently, there are two types of sources for 3D content, one being the direct use of binocular cameras to capture native 3D images and videos. However, binocular cameras are not yet popular and expensive, and the existing 2D images cannot be utilized, and need to be re-shot for 3D content, which is not suitable for the general needs of users at present. The other is to perform 3D conversion on existing 2D images and videos. However, most of the 3D content is post-produced manually using professional software, and is mostly used in cinematic production. Manual post-production is expensive, time-consuming, and labor-intensive, and also not applicable to the general requirements of users.

With the rise of deep learning, the application of deep learning techniques to three-dimensional image generation has become one of the leading research directions in the display field. Compared with manual post-production, the 3D image generation technology based on deep learning has the advantages of high efficiency, low cost, high generation quality, and the like, and is quite suitable to satisfy a wide variety of consumer-grade demands.

Figure 1:
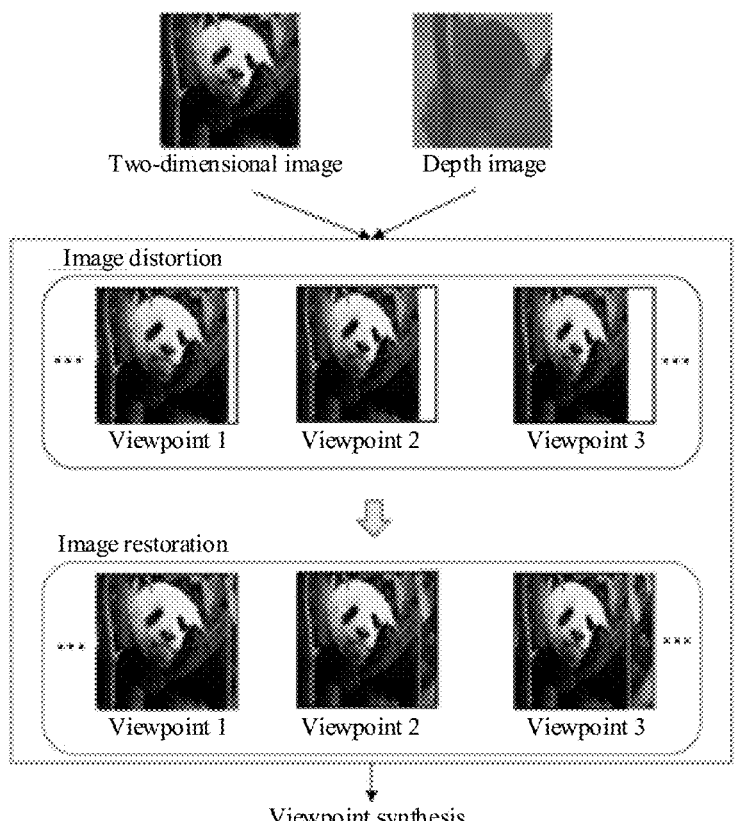
FIG. 1 is a schematic diagram of an exemplary method for rendering viewpoints.

FIG. 1 is a schematic diagram of an exemplary method for rendering viewpoints. As shown in FIG. 1, a conventional viewpoint rendering process for a three-dimensional image mainly includes two aspects: firstly, an image distortion algorithm; and secondly, an image restoration algorithm. The image distortion algorithm refers to performing pixel offset on a two-dimensional image according to the inputted two-dimensional image and the corresponding depth image, to acquire a new viewpoint image. The image restoration algorithm refers to restoring some blank spaces without pixel values existing in the acquired viewpoint image due to an image distortion algorithm, such that the content of the entire viewpoint image is smooth and natural.

However, the current image distortion algorithm is overly dependent on the high accuracy of a depth image, which may greatly affect the quality of viewpoint image generation in the case that the inputted depth image is not accurate enough, and the existing image restoration algorithm causes serious artifacts in viewpoint image generation.

To solve at least one of the technical problems described above, the embodiments of the present disclosure provide a method and apparatus for rendering viewpoints. The method and apparatus for rendering viewpoints according to the embodiments of the present disclosure are further described in detail below with reference to the accompanying drawings and specific embodiments.

In a first aspect, the embodiments of the present disclosure provide a method for rendering viewpoints. FIG. 2 is a schematic flowchart of a method for rendering viewpoints according to some embodiments of the present disclosure. As shown in FIG. 2, the method for rendering viewpoints includes the following S201 to S204.

In S201, a first initial feature of a two-dimensional image and a second initial feature of a depth image corresponding to the two-dimensional image are acquired by performing initial feature extraction on the two-dimensional image and the depth image.

In the S201 described above, the original two-dimensional image $F_{2D}$ and the corresponding depth image $F_{Dep}$ thereof are used as inputs of a generation network, and both are inputted into an initial feature-extracting module for initial feature extraction, such that a first initial feature $F_{2D\text{-}init}$ of the two-dimensional image and a second initial feature $F_{Dep\text{-}init}$ of the depth image are acquired, both with the dimensions of B×C×H×W (where C is the number of designed channels and B is the size of batch processing set during training).

In S202, a first initial dimension reduction feature is acquired by splicing the first initial feature and the second initial feature in a channel dimension, and performing channel dimension reduction.

In the S202 described above, the first initial feature $F_{2D\text{-}init}$ and the second initial feature $F_{Dep\text{-}init}$ are spliced in a channel dimension to acquire a feature with a dimension of B×(2C)×H×W. The feature is subjected to channel dimension reduction through a two-dimensional convolutional neural network layer to acquire a first initial dimension reduction feature $F_{init\text{-}down}$ with a dimension of B×C×H×W.

In S203, a fusion feature is acquired by performing image distortion and restoration on the first initial dimension reduction feature for multiple times.

In the S203 described above, the first initial dimension reduction feature $F_{init\text{-}down}$ is inputted into n fusing modules for image distortion and restoration, to acquire a fusion feature $F_{fusion}$ with a dimension of B×C×H×W.

In S204, a plurality of viewpoint images are generated by performing fusion and channel dimension reduction on the fusion feature.

In the S204 described above, the fusion feature $F_{fusion}$ is inputted into an outputting module for fusion and channel dimension reduction, to finally acquire a generated viewpoint image $F_{out}$ with a dimension of B×3×H×W.

In the method for rendering viewpoints according to some embodiments of the present disclosure, after a user uploads a common two-dimensional image, each viewpoint image is automatically rendered, which does not have to depend on a high-precision depth image, effectively improving the robustness of image distortion under the condition of poor accuracy of a depth image. Therefore, artifact problems caused by an image restoration algorithm are significantly ameliorated, satisfying the high-quality requirement of viewpoint image generation. In addition, the distortion and the restoration of the image are combined together for a simplification purpose, such that the generation speed of the viewpoint image is significantly improved.

In some embodiments, FIG. 3 is a schematic flowchart of another method for rendering viewpoints according to some embodiments of the present disclosure. As shown in FIG. 3, in the method for rendering viewpoints, after generating the plurality of viewpoint images by performing fusion and channel dimension reduction on the fusion feature, the method further includes the following S301 to S303.

In S301, a third initial feature and a fourth initial feature are acquired by performing initial feature extraction on the viewpoint image and a corresponding label image.

In the S301 described above, one layer of two-dimensional convolutional neural networks is used for initial feature extraction on the viewpoint image outputted by a generation network and the corresponding label image (both with a dimension of $B \times 3 \times H \times W$) separately, to acquire a three initial feature and a fourth initial feature, both with a dimension of $B \times C \times H \times W$.

In S302, a second initial dimension reduction feature and a third initial dimension reduction feature are acquired by performing width and height dimension down-sampling on the third initial feature and the fourth initial feature, reducing the width and height dimensions to 1, and reducing the channel dimension to 1.

In the S302 described above, down-samplings in the width dimension and the height dimension are performed through n sampling and dimension-reducing modules with step sizes of 2 and 1, then the width dimension and the height dimension are reduced to 1 with a dimension of $B \times C \times 1 \times 1$, and then the channel dimension is reduced to 1 using one layer of two-dimensional convolutional neural networks, to generate a second initial dimension reduction feature and a third initial dimension reduction feature, both with a dimension of $B \times 1 \times 1 \times 1$.

In S303, the second initial dimension reduction feature and the third initial dimension reduction feature are discriminated based on the label image.

In the S303 described above, the second initial dimension reduction feature and the third initial dimension reduction feature are discriminated based on the label image until the second initial dimension reduction feature and the third initial dimension reduction feature are close in similarity to the label image. In the case that there is a significant difference in similarity between the second initial dimension reduction feature and the third initial dimension reduction feature, the S301 and S302 described above are repeated.

In some embodiments, FIG. 4 is a schematic flowchart of still another method for rendering viewpoints according to some embodiments of the present disclosure. As shown in FIG. 4, in the method for rendering viewpoints, after generating the plurality of viewpoint images by performing fusion and channel dimension reduction on the fusion feature, the method further includes the following S401 to S403.

In S401, a fifth initial feature and a sixth initial feature are acquired by performing initial feature extraction on the viewpoint image and a corresponding label image.

In the S401 described above, one layer of two-dimensional convolutional neural networks is used for initial feature extraction on the viewpoint image outputted by a generation network and the corresponding label image (both with a dimension of $B \times 3 \times H \times W$) separately, to acquire a fifth initial feature and a sixth initial feature, both with a dimension of $B \times C \times H \times W$.

In S402, a fourth initial dimension reduction feature and a fifth initial dimension reduction feature are acquired by performing width and height dimension down-sampling on the fifth initial feature and the sixth initial feature and reducing the channel dimension to 1.

In the S402 described above, down-samplings in the width dimension and the height dimension are performed through n sampling and dimension-reducing modules with step sizes of 2 and 1, the dimension of which is $B \times C \times (H//$ $n) \times (W//n)$. Then, the channel dimension is reduced to 1 using one layer of two-dimensional convolutional neural networks to generate a fourth initial dimension reduction feature and a fifth initial dimension reduction feature, both with a dimension of $B \times 1 \times (H//n) \times (W//n)$.

In S403, the fourth initial dimension reduction feature and the fifth initial dimension reduction feature are discriminated based on the label image.

In the S403 described above, the fourth initial dimension reduction feature and the fifth initial dimension reduction feature are discriminated based on the label image until the fourth initial dimension reduction feature and the fifth initial dimension reduction feature are close in similarity to the label image. In the case that there is a significant difference in similarity between the second initial dimension reduction feature and the third initial dimension reduction feature, the S401 and S402 described above are repeated.

In some embodiments, the number of groups of the fourth initial dimension reduction feature and the fifth initial dimension reduction feature is a plurality of groups. Each group of the fourth initial dimension reduction feature and the fifth initial dimension reduction feature corresponds to the discriminated pixel blocks from large to small.

In the S402 described above, after down-samplings in the width dimension and the height dimension, the width and height dimensions are not 1, that is, the image is divided into a plurality of pixel blocks for discrimination separately, instead of discriminating the entire image. Meanwhile, in the case that the pixel blocks are discriminated, the number of the sampling and dimension-reducing modules is changed, such that the size of the discriminated pixel blocks is changed, thus achieving gradual discrimination.

In some embodiments, FIG. 5 is a schematic flowchart of yet still another method for rendering viewpoints according to some embodiments of the present disclosure. As shown in FIG. 5, in the method for rendering viewpoints, before acquiring the first initial feature of the two-dimensional image and the second initial feature of the depth image corresponding to the two-dimensional image by performing initial feature extraction on the two-dimensional image and the depth image, the method further includes S501. In S501, the depth image corresponding to the two-dimensional image is generated by inputting the two-dimensional image into a monocular depth estimation model.

In the S501 described above, the original two-dimensional image $F_{2D}$ (with a dimension of $3 \times H \times W$, where 3 represents RGB3 channel, H represents the height of the video frame, and W represents the width of the video frame) is inputted into an open-source monocular depth estimation algorithm (such as Monodepth, Monodepth2, etc.), to acquire a corresponding depth image $F_{Dep}$ (with a dimension of $3 \times H \times W$, which is consistent with the dimension of the inputted two-dimensional image $F_{2D}$).

In some embodiments, as shown in FIG. 5, in the method for rendering viewpoints, after generating the plurality of viewpoint images by performing fusion and channel dimension reduction on the fusion feature, the method further includes S503 and S504.

In S503, a synthesized viewpoint image is acquired by splicing the plurality of viewpoint images in the width dimension.

In S504, a three-dimensional image is generated by inter-leaving the synthesized viewpoint image.

In the S601 and S602 described above, taking two viewpoints as an example, a synthesized 3D two-viewpoint image $F_{3D}$ is acquired by splicing the first viewpoint image $F_{2D,1}$ and the second viewpoint image $F_{2D,2}$ in a width dimension. The 3D two-viewpoint image $F_{3D}$ is interleaved using a corresponding interleaving algorithm, such that the 3D two-viewpoint image is displayed on a 3D display device.

Figure 6:
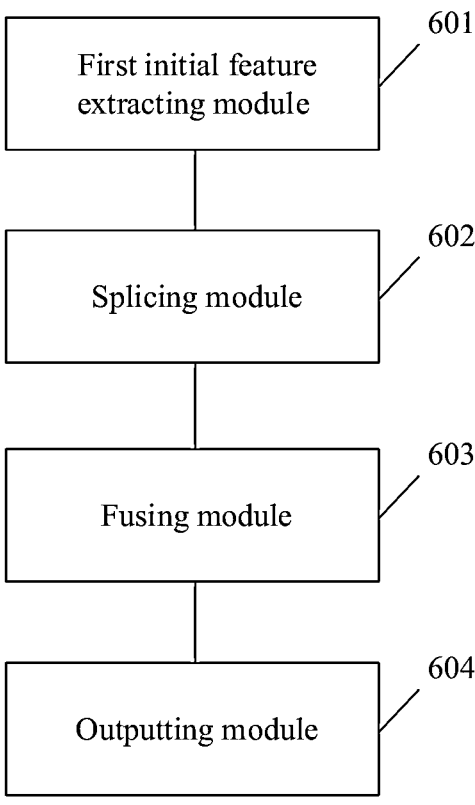
FIG. 6 is a schematic structural diagram of an apparatus for rendering viewpoints according to some embodiments of the present disclosure.

In a second aspect, the embodiments of the present disclosure provide an apparatus for rendering viewpoints. FIG. 6 is a schematic structural diagram of the apparatus for rendering viewpoints according to some embodiments of the present disclosure. As shown in FIG. 6, the apparatus for rendering viewpoints includes a first initial feature-extracting module 601, a splicing module 602, a fusing module 603, and an outputting module 604.

The first initial feature-extracting module 601 is configured to acquire a first initial feature of a two-dimensional image and a second initial feature of a depth image corresponding to the two-dimensional image by performing initial feature extraction on the two-dimensional image and the depth image.

Figure 7:
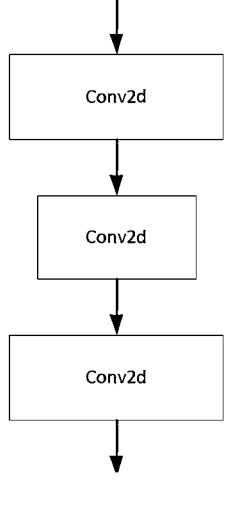
FIG. 7 is a schematic structural diagram of a first feature-extracting module in an apparatus for rendering viewpoints according to some embodiments of the present disclosure.

FIG. 7 is a schematic structural diagram of a first feature-extracting module in an apparatus for rendering viewpoints according to some embodiments of the present disclosure. As shown in FIG. 7, the first initial feature-extracting module 601 includes three layers of two-dimensional convolutional neural networks. The original two-dimensional image $F_{2D}$) and the corresponding depth image $F_{Dep}$ thereof are used as inputs of a generation network. Firstly, 2-fold dimension reduction is performed on the inputted feature (with a dimension of B×C×H×W) in a channel dimension using one layer of two-dimensional convolutional neural networks to acquire a feature with a dimension of B×(C// 2)×H×W. Then, one layer of two-dimensional convolutional neural networks is used for efficient extraction on the feature to acquire a feature with a dimension of B×(C//2)×H×W. Finally, one layer of two-dimensional convolutional neural networks is used for channel dimension increasing on the feature to acquire a first initial feature $F_{2D-init}$ and a second initial feature $F_{Dep-init}$ of the depth image, with a dimension of B×C×H×W. The first initial feature-extracting module 601 presents a funnel shape in the channel dimension, and the design achieves better a balance between calculation amount and performance.

The splicing module 602 is configured to acquire a first initial dimension reduction feature by splicing the first initial feature and the second initial feature in a channel dimension and performing channel dimension reduction.

Figure 8:
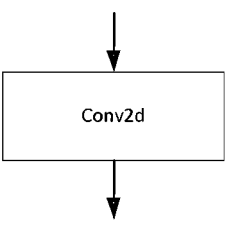
FIG. 8 is a schematic structural diagram of a splicing module in an apparatus for rendering viewpoints according to some embodiments of the present disclosure.

FIG. 8 is a schematic structural diagram of a splicing module in an apparatus for rendering viewpoints according to some embodiments of the present disclosure. As shown in FIG. 8, the splicing module 602 includes one layer of two-dimensional convolutional neural networks. The first initial feature $F_{2D-init}$ and the second initial feature $F_{Dep-init}$ are spliced in a channel dimension to acquire a feature with a dimension of B×(2C)×H×W. The feature is subjected to dimension reduction through a two-dimensional convolutional neural network layer to acquire a first initial dimension reduction feature $F_{init-down}$ with a dimension of B×C× H×W.

The fusing module 603 is configured to acquire a fusion feature by performing image distortion and restoration on the first initial dimension reduction feature for multiple times.

Figure 9:
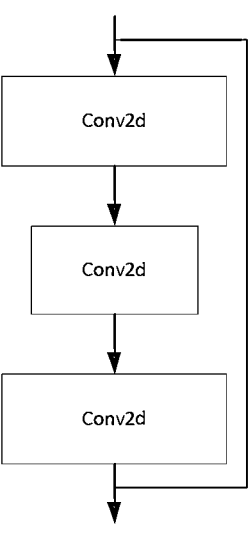
FIG. 9 is a schematic structural diagram of a fusing module in an apparatus for rendering viewpoints according to some embodiments of the present disclosure.

FIG. 9 is a schematic structural diagram of a fusing module in an apparatus for rendering viewpoints according to some embodiments of the present disclosure. As shown in FIG. 9, the fusing module 603 includes three layers of two-dimensional convolutional neural networks. The fusing module 603 differs from the first initial feature-extracting module 601 in that the first layer of two-dimensional convolutional neural networks and the third layer of two-dimensional convolution neural networks are connected by residual connection, which facilitates optimization and convergence of the network. The first initial feature $F_{2D-init}$ and the second initial feature $F_{Dep-init}$ are spliced in a channel dimension to acquire a feature with a dimension of B×(2C)× H×W. The feature is subjected to dimension reduction through a two-dimensional convolutional neural network layer to acquire a first initial dimension reduction feature $F_{init-down}$ with a dimension of B×C×H×W.

The outputting module 604 is configured to generate a plurality of viewpoint images by performing fusion and channel dimension reduction on the fusion feature.

Figure 10:
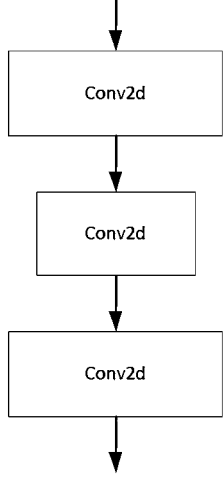
FIG. 10 is a schematic structural diagram of an outputting module in an apparatus for rendering viewpoints according to some embodiments of the present disclosure.

FIG. 10 is a schematic structural diagram of an outputting module in an apparatus for rendering viewpoints according to some embodiments of the present disclosure. As shown in FIG. 10, the outputting module 604 includes three layers of two-dimensional convolutional neural networks. The three layers of two-dimensional convolutional neural networks gradually achieve channel dimension reduction to output a final color three-channel viewpoint image $F_{out}$ with a dimension of B×3×H×W.

Figure 11:
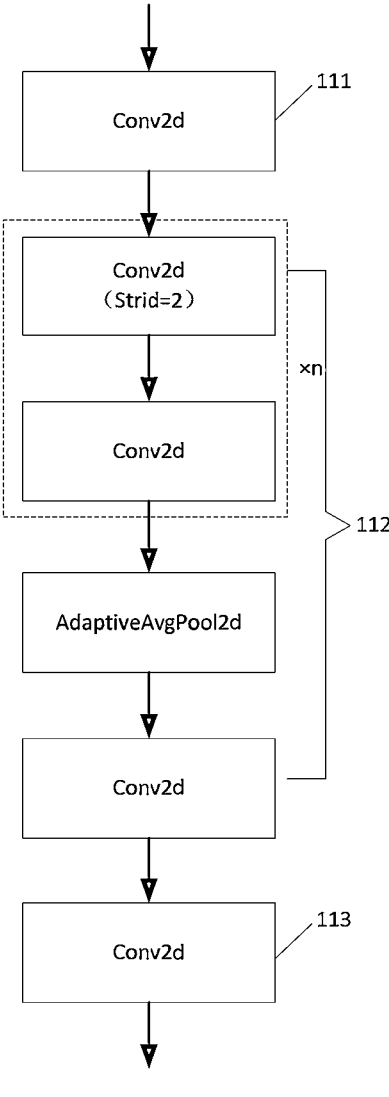
FIG. 11 is a schematic structural diagram of another apparatus for rendering viewpoints according to some embodiments of the present disclosure.

In some embodiments, FIG. 11 is a schematic structural diagram of another apparatus for rendering viewpoints according to some embodiments of the present disclosure. As shown in FIG. 11, the apparatus for rendering viewpoints further includes a second initial feature-extracting module 111, a first down-sampling and dimension-reducing module 112, and a first discriminating module 113.

The second initial feature-extracting module 111 is configured to acquire a third initial feature and a fourth initial feature by performing initial feature extraction on the viewpoint image and a corresponding label image.

As shown in FIG. 11, the second initial feature-extracting module 111 includes one layer of two-dimensional convolutional neural networks. One layer of two-dimensional convolutional neural networks is used for initial feature extraction on the viewpoint image outputted by a generation network and the corresponding label image (both with a dimension of B×3×H×W) separately, to acquire a three initial feature and a fourth initial feature, both with a dimension of B×C×H×W.

The first down-sampling and dimension-reducing module 112 is configured to acquire a second initial dimension reduction feature and a third initial dimension reduction feature by performing width and height dimension downsampling on the third initial feature and the fourth initial feature and reducing the channel dimension to 1.

As shown in FIG. 11, the first down-sampling and dimension-reducing module 112 includes a plurality of layers of two-dimensional convolutional neural networks with a stride of 2 and a step size of 1 and one layer of binary self-adapting mean value pooling layer (AdaptiveAvgPool2d). Down-samplings in the width dimension and the height dimension are performed through n sampling and dimension-reducing modules with step sizes of 2 and 1. Then, the width dimension and the height dimension are reduced to 1 with a dimension of B×C×1×1 using one layer of binary self-adapting mean value pooling layer. And then, the channel dimension is reduced to 1 using one layer of two-dimensional convolutional neural networks, to generate a second initial dimension reduction feature and a third initial dimension reduction feature, both with a dimension of B×1×1×1.

The first discriminating module 113 is configured to discriminate the second initial dimension reduction feature and the third initial dimension reduction feature based on the label image.

As shown in FIG. 11, the first discriminating module 113 includes one layer of two-dimensional convolutional neural networks. The second initial dimension reduction feature and the third initial dimension reduction feature are discriminated through one layer of two-dimensional convolutional neural networks based on the label image until the second initial dimension reduction feature and the third initial dimension reduction feature are close in similarity to the label image. In the case that there is a significant difference in similarity between the second initial dimension reduction feature and the third initial dimension reduction feature, the procedure described above is repeated.

Figure 12:
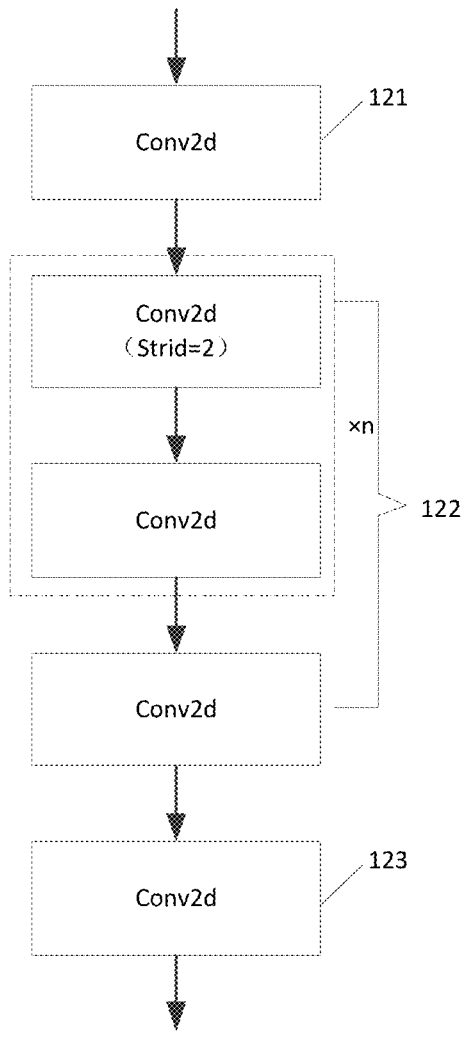
FIG. 12 is a schematic structural diagram of another apparatus for rendering viewpoints according to some embodiments of the present disclosure.

In some embodiments, FIG. 12 is a schematic structural diagram of another apparatus for rendering viewpoints according to some embodiments of the present disclosure. As shown in FIG. 12, the apparatus for rendering viewpoints further includes a third initial feature-extracting module 121, a second down-sampling and dimension-reducing module 122, and a second discriminating module 123.

The third initial feature-extracting module 121 is configured to acquire a fifth initial feature and a sixth initial feature by performing initial feature extraction on the viewpoint image and a corresponding label image.

As shown in FIG. 12, the third initial feature-extracting module 121 includes one layer of two-dimensional convolutional neural networks. One layer of two-dimensional convolutional neural networks is used for initial feature extraction on the viewpoint image outputted by a generation network and the corresponding label image (both with a dimension of B×3×H×W) separately, to acquire the fifth initial feature and the sixth initial feature, both with a dimension of B×C×H×W.

The second down-sampling and dimension-reducing module 122 is configured to acquire a fourth initial dimension reduction feature and a fifth initial dimension reduction feature by performing width and height dimension down-sampling on the fifth initial feature and the sixth initial feature and reducing the channel dimension to 1.

As shown in FIG. 12, the second down-sampling and dimension-reducing module 122 includes a plurality of layers of two-dimensional convolutional neural networks with a stride of 2 and a step size of 1 and one layer of two-dimensional convolutional neural networks. Down-samplings in the width dimension and the height dimension are performed through n sampling and dimension-reducing modules with step sizes of 2 and 1, the dimension of which is B×C×(H//n)×(W//n). Then, the channel dimension is reduced to 1 using one layer of two-dimensional convolutional neural networks to generate a fourth initial dimension reduction feature and a fifth initial dimension reduction feature, both with a dimension of B×1×(H//n)×(W//n).

The second discriminating module 123 is configured to discriminate the fourth initial dimension reduction feature and the fifth initial dimension reduction feature based on the label image.

The second discriminating module 123 includes one layer of two-dimensional convolutional neural networks. The fourth initial dimension reduction feature and the fifth initial dimension reduction feature are discriminated based on the label image until the fourth initial dimension reduction feature and the fifth initial dimension reduction feature are close in similarity to the label image. In the case that there is a significant difference in similarity between the fourth initial dimension reduction feature and the fifth initial dimension reduction feature, the procedure described above is repeated.

In some embodiments, the apparatus for rendering viewpoints further includes a depth image generating module (not shown in the figure), configured to generate the depth image corresponding to the two-dimensional image by inputting the two-dimensional image into a monocular depth estimation model.

The depth image generating module inputs the original two-dimensional image $F_{2D}$ (with a dimension of 3×H×W, where 3 represents RGB3 channel, H represents the height of the video frame, and W represents the width of the video frame) into an open-source monocular depth estimation algorithm (such as Monodepth, Monodepth2, etc.), to acquire a corresponding depth image $F_{Dep}$ (with a dimension of 3×H×W, which is consistent with the dimension of the inputted two-dimensional image $F_{2D}$).

In some embodiments, the apparatus for rendering viewpoints further includes a synthesizing module (not shown in the figure), configured to acquire a synthesized viewpoint image by splicing the plurality of the viewpoint images in a width dimension; and an interleaving module (not shown in the figure), configured to generate a three-dimensional image by interleaving the synthesized viewpoint image.

Taking two viewpoints, i.e., the first viewpoint image $F_{2D,1}$ and the second viewpoint image $F_{2D,2}$, as an example, a synthesized 3D two-viewpoint image $F_{3D}$ is acquired through the synthesizing module by splicing the two viewpoints in a width dimension. The interleaving module interleaves the 3D two-viewpoint image $F_{3D}$ using a corresponding interleaving algorithm, such that the 3D two-viewpoint image is displayed on a 3D display device.

Figure 13:
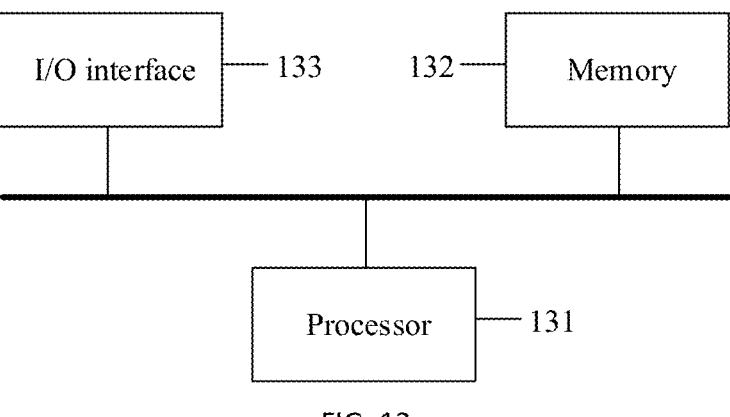
FIG. 13 is a schematic structural diagram of an electronic device according to some embodiments of the present disclosure.

In a third aspect, the embodiments of the present disclosure provide an electronic device. FIG. 13 is a schematic structural diagram of the electronic device according to some embodiments of the present disclosure. As shown in FIG. 13, the electronic device includes: one or more processors 131; a memory 132 stores one or more computer programs executable by the at least one processor, wherein the at least one processor, when loading and executing the one or more computer programs, is caused to perform the method for rendering viewpoints according to any one of the embodiments described above; and one or more I/O interfaces 133 connected between the processor and the memory and configured to enable information interaction between the processor and the memory.

The processor 131 is a device with data processing capability, including but not limited to, a central processing unit (CPU) and the like. The memory 132 is a device with data storage capability, including but not limited to, random access memory (RAM, more specifically SDRAM, DDR, etc.), a read-only memory (ROM), an electrically erasable programmable read-only memory (EEPROM), and a flash memory (FLASH). The I/O interface (read/write interface) 133 is connected between the processor 131 and the memory 132, achieving information interaction between the processor 131 and the memory 132, which includes but is not limited to a data bus (Bus) and the like.

In some embodiments, the processor 131, memory 132, and I/O interface 133 are connected to each other via a bus, and thus to other components of a computing device.

In a fourth aspect, the embodiments further provide a computer-readable storage medium storing at least one computer program therein, wherein the at least one computer program, when executed by a processor, causes the processor to perform the method for rendering viewpoints according to any one of the embodiments described above.

It will be understood by those of ordinary skill in the art that all or some of the steps, systems, and functional modules/units in the apparatus disclosed above are implemented as software, firmware, hardware, or suitable combinations thereof. In the embodiments of hardware, the division between functional modules/units referred to in the above description does not necessarily correspond to the division of physical components. For example, one physical component includes more than one function, or one function or step is executed by several physical components in cooperation. Some or all of the physical components are implemented as software executed by a processor, such as a central processing unit, digital signal processor, or microprocessor, or as hardware, or as an integrated circuit, e.g., an application-specific integrated circuit. Such software is distributed on a computer-readable medium which includes a computer storage medium (or a non-transitory medium) and a communication medium (or a transitory medium). The term computer storage medium includes a volatile and non-volatile, removable, and non-removable medium implemented in any method or technology for storage of information, such as computer-readable instructions, data structures, program modules, or other data, as is well known to those skilled in the art. A computer storage medium includes but is not limited to, RAM, ROM, EEPROM, flash memory or other memory technology, CD-ROM, digital versatile disks (DVD) or other optical disk storage, magnetic cassettes, magnetic tapes, magnetic disk storage or other magnetic storage apparatuses, or any other medium which is used to store desired information and can be accessed by a computer. In addition, a communication medium typically includes computer-readable instructions, data structures, program modules, or other data in a modulated data signal such as a carrier wave or other transport mechanisms, and includes any information delivery media, as is well known to those skilled in the art.

It should be understood that the above embodiments are merely exemplary embodiments employed to illustrate the principles of the present disclosure, and the present disclosure is not limited thereto. It will be apparent to those of ordinary skill in the art that various changes and modifications can be made without departing from the spirit and scope of the present disclosure, and these changes and modifications are also considered to fall within the scope of the present disclosure.

The invention claimed is:

1. A method for rendering viewpoints, comprising:
acquiring a first initial feature of a two-dimensional image and a second initial feature of a depth image corresponding to the two-dimensional image by performing initial feature extraction on the two-dimensional image and the depth image;
acquiring a first initial dimension reduction feature by splicing the first initial feature and the second initial feature in a channel dimension and performing channel dimension reduction;
acquiring a fusion feature by performing image distortion and restoration on the first initial dimension reduction feature for multiple times; and
generating a plurality of viewpoint images by performing fusion and channel dimension reduction on the fusion feature;
wherein after generating the plurality of viewpoint images by performing fusion and channel dimension reduction on the fusion feature, the method further comprises;

acquiring a third initial feature and a fourth initial feature by performing initial feature extraction on the viewpoint image and a corresponding label image;
acquiring a second initial dimension reduction feature and a third initial dimension reduction feature by performing width and height dimension down-sampling on the third initial feature and the fourth initial feature, reducing the width and height dimensions to 1, and reducing the channel dimension to 1; and
discriminating the second initial dimension reduction feature and the third initial dimension reduction feature based on the label image.

2. The method for rendering viewpoints according to claim 1, wherein after generating the plurality of viewpoint images by performing fusion and channel dimension reduction on the fusion feature, the method further comprises:
acquiring a fifth initial feature and a sixth initial feature by performing initial feature extraction on the viewpoint image and a corresponding label image;
acquiring a fourth initial dimension reduction feature and a fifth initial dimension reduction feature by performing width and height dimension down-sampling on the fifth initial feature and the sixth initial feature and reducing the channel dimension to 1; and
discriminating the fourth initial dimension reduction feature and the fifth initial dimension reduction feature based on the label image.

3. The method for rendering viewpoints according to claim 2, wherein a number of groups of the fourth initial dimension reduction feature and the fifth initial dimension reduction feature is a plurality of groups; wherein
each group of the fourth initial dimension reduction feature and the fifth initial dimension reduction feature corresponds to discriminated pixel blocks from large to small.

4. The method for rendering viewpoints according to claim 1, wherein before acquiring the first initial feature of the two-dimensional image and the second initial feature of the depth image corresponding to the two-dimensional image by performing initial feature extraction on the two-dimensional image and the depth image, the method further comprises:
generating the depth image corresponding to the two-dimensional image by inputting the two-dimensional image into a monocular depth estimation model.

5. The method for rendering viewpoints according to claim 1, wherein after generating the plurality of viewpoint images by performing fusion and channel dimension reduction on the fusion feature, the method further comprises:
acquiring a synthesized viewpoint image by splicing the plurality of the viewpoint images in a width dimension; and
generating a three-dimensional image by interleaving the synthesized viewpoint image.

6. An electronic device, comprising:
at least one processor; and
a memory stores one or more computer programs executable by the at least one processor,
wherein the at least one processor, when loading and executing the one or more computer programs, is caused to perform:
acquiring a first initial feature of a two-dimensional image and a second initial feature of a depth image corresponding to the two-dimensional image by performing initial feature extraction on the two-dimensional image and the depth image;

acquiring a first initial dimension reduction feature by splicing the first initial feature and the second initial feature in a channel dimension and performing channel dimension reduction;

acquiring a fusion feature by performing image distortion and restoration on the first initial dimension reduction feature for multiple times; and generating a plurality of viewpoint images by performing fusion and channel dimension reduction on the fusion feature;

wherein the at least one processor, when loading and executing the one or more computer programs, is caused to perform:

acquiring a third initial feature and a fourth initial feature by performing initial feature extraction on the viewpoint image and a corresponding label image;

acquiring a second initial dimension reduction feature and a third initial dimension reduction feature by performing width and height dimension down-sampling on the third initial feature and the fourth initial feature, reducing the width and height dimensions to 1, and reducing the channel dimension to 1; and discriminating the second initial dimension reduction feature and the third initial dimension reduction feature based on the label image.

7. The electronic device according to claim 6, wherein the at least one processor, when loading and executing the one or more computer programs, is caused to perform:

acquiring a fifth initial feature and a sixth initial feature by performing initial feature extraction on the viewpoint image and a corresponding label image;

acquiring a fourth initial dimension reduction feature and a fifth initial dimension reduction feature by performing width and height dimension down-sampling on the fifth initial feature and the sixth initial feature and reducing the channel dimension to 1; and discriminating the fourth initial dimension reduction feature and the fifth initial dimension reduction feature based on the label image.

8. The electronic device according to claim 7, wherein a number of groups of the fourth initial dimension reduction feature and the fifth initial dimension reduction feature is a plurality of groups; wherein each group of the fourth initial dimension reduction feature and the fifth initial dimension reduction feature corresponds to discriminated pixel blocks from large to small.

9. The electronic device according to claim 6, wherein the at least one processor, when loading and executing the one or more computer programs, is caused to perform:

generating the depth image corresponding to the two-dimensional image by inputting the two-dimensional image into a monocular depth estimation model.

10. The electronic device according to claim 6, wherein the at least one processor, when loading and executing the one or more computer programs, is caused to perform:

acquiring a synthesized viewpoint image by splicing the plurality of the viewpoint images in a width dimension; and generating a three-dimensional image by interleaving the synthesized viewpoint image.

11. A non-transitory computer-readable storage medium storing at least one computer program therein, wherein the at least one computer program, when executed by a processor, causes the processor to perform:

acquiring a first initial feature of a two-dimensional image and a second initial feature of a depth image corresponding to the two-dimensional image by performing initial feature extraction on the two-dimensional image and the depth image;

acquiring a first initial dimension reduction feature by splicing the first initial feature and the second initial feature in a channel dimension and performing channel dimension reduction;

acquiring a fusion feature by performing image distortion and restoration on the first initial dimension reduction feature for multiple times; and generating a plurality of viewpoint images by performing fusion and channel dimension reduction on the fusion feature;

wherein the at least one computer program, when executed by a processor, causes the processor to perform:

acquiring a third initial feature and a fourth initial feature by performing initial feature extraction on the viewpoint image and a corresponding label image;

acquiring a second initial dimension reduction feature and a third initial dimension reduction feature by performing width and height dimension down-sampling on the third initial feature and the fourth initial feature, reducing the width and height dimensions to 1, and reducing the channel dimension to 1; and discriminating the second initial dimension reduction feature and the third initial dimension reduction feature based on the label image.

12. The non-transitory computer-readable storage medium according to claim 11, wherein the at least one computer program, when executed by a processor, causes the processor to perform:

acquiring a fifth initial feature and a sixth initial feature by performing initial feature extraction on the viewpoint image and a corresponding label image;

acquiring a fourth initial dimension reduction feature and a fifth initial dimension reduction feature by performing width and height dimension down-sampling on the fifth initial feature and the sixth initial feature and reducing the channel dimension to 1; and discriminating the fourth initial dimension reduction feature and the fifth initial dimension reduction feature based on the label image.

13. The non-transitory computer-readable storage medium according to claim 12, wherein a number of groups of the fourth initial dimension reduction feature and the fifth initial dimension reduction feature is a plurality of groups; wherein each group of the fourth initial dimension reduction feature and the fifth initial dimension reduction feature corresponds to discriminated pixel blocks from large to small.

14. The non-transitory computer-readable storage medium according to claim 11, wherein the at least one computer program, when executed by a processor, causes the processor to perform:

generating the depth image corresponding to the two-dimensional image by inputting the two-dimensional image into a monocular depth estimation model.

15. The non-transitory computer-readable storage medium according to claim 11, wherein the at least one computer program, when executed by a processor, causes the processor to perform:

acquiring a synthesized viewpoint image by splicing the plurality of the viewpoint images in a width dimension; and generating a three-dimensional image by interleaving the
synthesized viewpoint image.

* * * * *